United States Patent
Andersen et al.

(10) Patent No.: US 12,297,809 B2
(45) Date of Patent: May 13, 2025

(54) CONTROL SYSTEM FOR ALIGNING A NACELLE OF A WIND TURBINE WITH A TARGET YAW ANGLE

(71) Applicant: Siemens Gamesa Renewable Energy A/S, Brande (DK)

(72) Inventors: Martin Folmer Andersen, Copenhagen (DK); Thomas Esbensen, Herning (DK); Carla Hagler, Vejle (DK); Samuel Hawkins, Vejle (DK); Oscar Ramirez Requeson, Vallensbæk Strand (DK); Ryan A. Sievers, Lyons, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/574,356

(22) PCT Filed: May 31, 2022

(86) PCT No.: PCT/EP2022/064780
§ 371 (c)(1),
(2) Date: Dec. 27, 2023

(87) PCT Pub. No.: WO2023/274645
PCT Pub. Date: Jan. 5, 2023

(65) Prior Publication Data
US 2024/0271597 A1    Aug. 15, 2024

(30) Foreign Application Priority Data
Jul. 2, 2021    (EP) ...................... 21183384

(51) Int. Cl.
*F03D 7/02*    (2006.01)
*F03D 17/00*    (2016.01)

(52) U.S. Cl.
CPC ......... *F03D 7/0212* (2013.01); *F03D 17/014* (2023.08); *F05B 2260/80* (2013.01);
(Continued)

(58) Field of Classification Search
CPC .. F03D 7/0212; F03D 17/014; F05B 2260/80; F05B 2270/321; F05B 2270/329;
(Continued)

(56) References Cited

U.S. PATENT DOCUMENTS

2020/0032770 A1*   1/2020   Nielsen .................. G01P 13/02
2021/0246875 A1*   8/2021   Fu ........................... F03D 7/042
(Continued)

FOREIGN PATENT DOCUMENTS

DE   10 2011 112732 A1    3/2013
EP        1 429 025 A1    6/2004
(Continued)

OTHER PUBLICATIONS

EP 3685037 (Year: 2018).*
(Continued)

Primary Examiner — Aaron R Eastman
(74) Attorney, Agent, or Firm — Schmeiser, Olsen & Watts, LLP

(57) ABSTRACT

A wind turbine, a method and a control system for aligning a nacelle of a wind turbine with a target yaw angle is provided, wherein the control system includes a detection device configured for detecting at least one parameter indicative of wind forces acting on at least one component of the wind turbine for determining a current yaw angle of the nacelle, and an actuation device configured for manipulating a position of the nacelle until the current yaw angle is aligned with the target yaw angle, wherein the detection device includes at least one first bending moment sensor on a first component, wherein the detection device is configured
(Continued)

Figure 1:
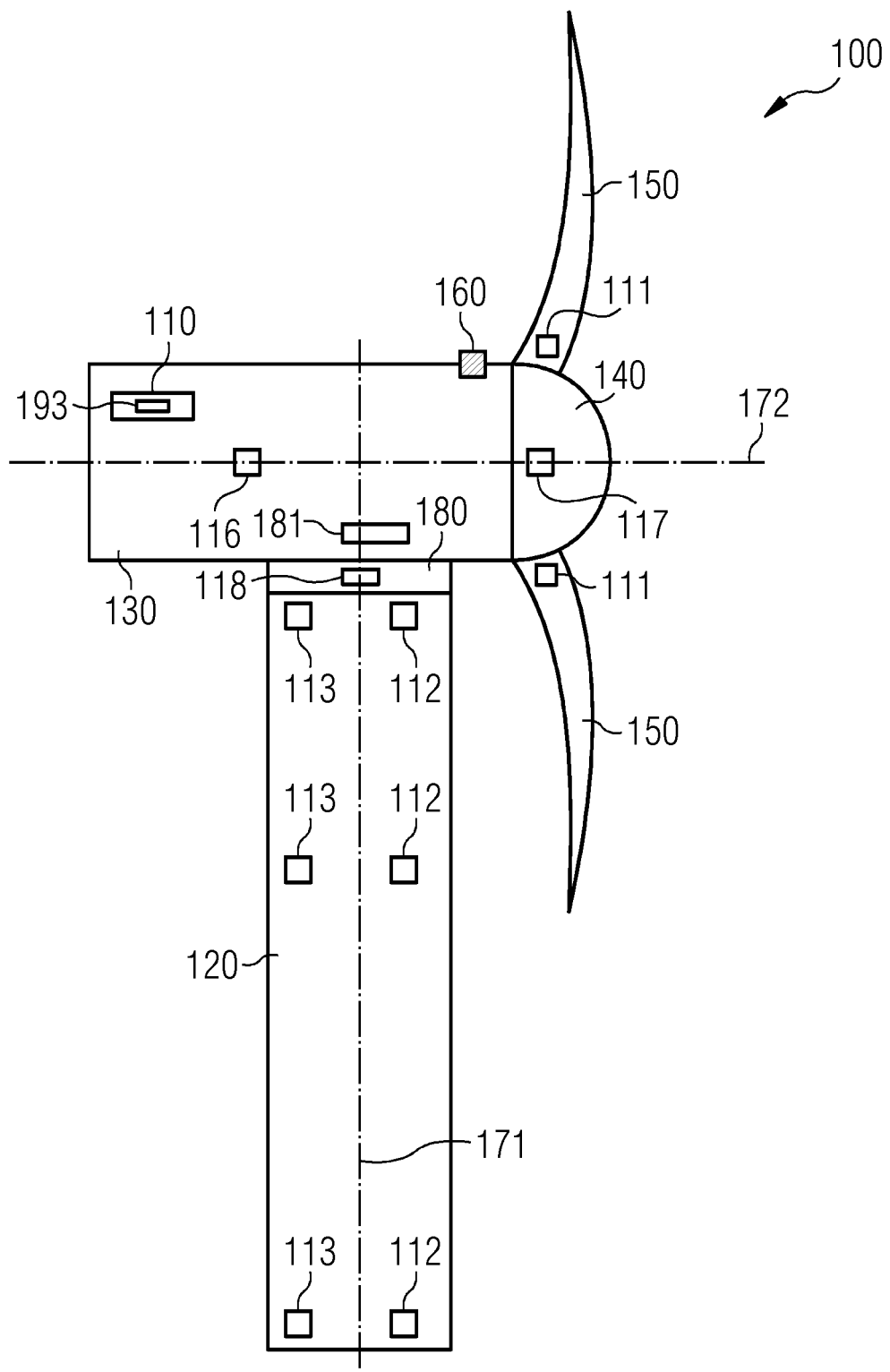

for determining a bending moment of the first component based on data received from the first bending moment sensor as the at least one parameter indicative of wind forces acting on the at least one component of the wind turbine.

19 Claims, 2 Drawing Sheets

(52) U.S. Cl.
CPC ... *F05B 2270/321* (2013.01); *F05B 2270/329* (2013.01); *F05B 2270/331* (2013.01); *F05B 2270/807* (2013.01); *F05B 2270/808* (2013.01)

(58) Field of Classification Search
CPC .......... F05B 2270/331; F05B 2270/807; F05B 2270/808

See application file for complete search history.

(56) References Cited

U.S. PATENT DOCUMENTS

| | | | |
|---|---|---|---|
| 2023/0003199 A1* | 1/2023 | Arroyo Beltri | F03D 17/00 |
| 2023/0077025 A1* | 3/2023 | Fu | F03D 17/00 |

FOREIGN PATENT DOCUMENTS

| | | | | |
|---|---|---|---|---|
| EP | 2 653 721 A1 | 10/2013 | | |
| EP | 2 807 373 A1 | 12/2014 | | |
| EP | 3 519 693 A1 | 8/2019 | | |
| EP | 3685037 B1 * | 11/2023 | ........... | F03D 7/0204 |
| WO | WO-2013034235 A1 * | 3/2013 | ........... | F03D 7/0204 |

OTHER PUBLICATIONS

WO 2013/034235 (Year: 2013).*
International Seach Report for PCT/EP2022/064780 mailed on Aug. 23, 2022.
Written Opinion for PCT/EP2022/064780 mailed on Aug. 23, 2022.
International Preliminary Report on Patentability for PCT/EP2022/064780 mailed on Jun. 15, 2023.

* cited by examiner

CONTROL SYSTEM FOR ALIGNING A NACELLE OF A WIND TURBINE WITH A TARGET YAW ANGLE

CROSS-REFERENCE TO RELATED APPLICATIONS

This application claims priority to PCT Application No. PCT/EP2022/064780, having a filing date of May 31, 2022, which claims priority to EP Application No. 21183384.3, having a filing date of Jul. 2, 2021, the entire contents both of which are hereby incorporated by reference.

FIELD OF TECHNOLOGY

The following relates to a control system for aligning a nacelle of a wind turbine with a target yaw angle. Further, the following relates to a wind turbine and a method for aligning a nacelle of a wind turbine with a target yaw angle.

BACKGROUND

In the technical field of wind turbines, it is known that an extreme weather event, such as an approaching storm and/or tropical cyclone can cause very high loads on a wind turbine. In some cases, it may be desirable for a normally upwind oriented wind turbine rotor respectively nacelle to be adjusted to the downwind orientation. During extreme weather events, wind sensors may fail or provide erroneous wind direction values due to high turbulence, rapid changes in wind speed or wind direction, wind speeds being beyond sensor capabilities, a sub-optimal mounting location for the downwind orientation, as well as blockage or other effects during transition between the upwind orientation and the downwind orientation. When the wind direction sensors fail or provide erroneous wind direction readings, the wind turbine cannot yaw to or maintain the correct downwind orientation or any other yaw angle dependent on exact wind direction readings. During extreme weather events, a misalignment with respect to the true downwind orientation will increase both the loads on the wind turbine as well as the power consumption, due to the wind turbine responding to an erroneous signal and/or maintaining the nacelle at a slightly upwind orientation in high winds. If the wind turbine has a power backup system, such as batteries, minimizing power consumption is important if the grid connection has been lost, as is often the case during extreme weather events. In this case, increased power consumption increases the likelihood that the wind turbine will run out of battery power and be unable to follow the wind at the downwind position for an extended period without grid power.

In current solutions more expensive or additional wind direction sensors are used which have a wider operating range. Alternatively, yawing of the nacelle to the downwind orientation may be initiated at lower wind speed thresholds to ensure that the wind direction sensors are in range during yawing, or a yawing of the nacelle may be stopped based on a nacelle position rather than a wind direction signal. Furthermore, the allowable yaw error (yaw dead band) may be increased to accommodate the reduced accuracy of the wind direction sensors in high winds, resulting in increased loads on the wind turbine.

EP 1 429 025 A1 discloses an upwind type of wind turbine having a nacelle supported for rotation on a support, the nacelle is rotated to a downwind position by rotating it by 180° from normal upwind position and kept in stand-by condition at a downwind position when detected wind speed is higher than the predetermined cutout wind speed which is the reference wind speed for shifting to an idle operation state. When the detected wind speed is higher than the DWSS wind speed determined based on the maximum permissible instantaneous wind speed, the nacelle is rotated from an upwind position to downwind position and the yaw brake is released.

Hence, there may be a need for providing an active system which is able to actively change a position of the nacelle of a wind turbine such that an alignment of the nacelle with a specific target yaw angle may be providable in a reliable and safe manner. Therefore, loads on the wind turbine may be reduced and a power consumption of the at least one yaw motor may be reduced. Hence, an availability of a yaw capability and hence an annual energy production may be increased.

SUMMARY

An aspect relates to a reliable and robust control system for aligning a nacelle of a wind turbine with a target yaw angle.

According to a first aspect of embodiments of the present invention there is provided a control system for aligning a nacelle of a wind turbine with a target yaw angle. The control system comprising a detection device configured for detecting at least one parameter indicative of wind forces acting on at least one component of the wind turbine for determining a current yaw angle based on the position of the nacelle, and an actuation device configured for manipulating the position of the nacelle until the current yaw angle is aligned with the target yaw angle.

The detection device further comprises at least one first bending moment sensor on a first component of the wind turbine, and at least one second bending moment sensor on a second component of the wind turbine, wherein the detection device is further configured for determining a bending moment of the first component of the wind turbine based on data received from the first bending moment sensor as the at least one parameter indicative of wind forces acting on the at least one component of the wind turbine, and a bending moment of the second component of the wind turbine based on data measured by the second bending moment sensor, and wherein the detection device is further configured for cross-checking the bending moment of the first component of the wind turbine with the bending moment of the second component of the wind turbine.

The described control system is based on the idea that a control system may be provided which may align the nacelle of the wind turbine relatively to the wind direction under circumstances in which the wind direction sensor(s) may provide erroneous values or no values at all. Additionally, the described control system may reduce the likelihood that the wind turbine tries to yaw to or maintain an orientation that is not aligned with the true target yaw angle, particularly the true downwind orientation. As a result, the described control system may reduce the loads acting on the wind turbine. Additionally, the yaw motor(s) may not consume excess power trying to maintain a slightly erroneous yaw angle, particularly a slightly upwind orientation if the target yaw angle is the downwind orientation. The described control system may also allow the wind turbine to have a higher wind speed threshold for initiating the yaw to the downwind orientation. This may increase the availability of the wind turbine. Particularly, if the wind drops back below the maximum cut-in wind speed, the wind turbine does not have to first yaw back upwind to produce power.

This may result in an increased availability of a yaw capability without the need to add additional sensors or without the need to upgrade existing sensors. Additionally, the annual energy production may be increased by allowing the wind turbine to remain at the upwind orientation for an extended time and to faster return to producing power.

The yaw angle according to embodiments of the present invention may correspond to an angle of a rotor axis of the wind turbine relative to the wind direction of the incoming wind field. The rotor axis of the wind turbine may be the axis around which the rotor, particularly the hub and the three blades, turn. At an upwind orientation of the wind turbine the nacelle may be positioned directly to the incoming wind field and the blades may be positioned at the same side of the tower relative to the incoming wind field. In other words, the rotor axis may be parallel to the wind direction of the incoming wind field. Hence, the angle between the wind direction of the incoming wind field and the rotor axis may be substantially zero degrees (0°). At a downwind orientation of the wind turbine the blades may be positioned at an opposite side of the tower relative to the incoming wind field. Hence, the angle between the wind direction of the incoming wind field and the rotor axis may be 180°.

The detection device according to embodiments of the present invention may comprise at least two detection units. A first detection unit is configured for detecting at least one parameter indicative of wind forces acting on at least one component of the wind turbine. A second detection unit is configured for determining a current yaw angle of the nacelle based on the at least one parameter. The first detection unit and the second detection unit are interconnected such that communication between the first detection unit and the second detection unit may be possible. Alternatively, the detection device may comprise a single detection unit able to both detect the at least one parameter and determine a current yaw angle based on the detected at least one parameter.

The actuation device according to the present application may comprise at least two actuation units. A first actuation unit configured for manipulating, particularly yawing, the nacelle to a position such that the current yaw angle is aligned with the target yaw angle. Additionally, the first actuation unit may be interconnected to a second actuation unit. The second actuation unit may be configured for ensuring that the nacelle stops yawing if the current yaw angle is aligned with the target yaw angle. Alternatively, the actuation device may comprise a single actuation unit configured for both manipulating a nacelle position and at the same time ensuring that the manipulating of the nacelle position stops if the current yaw angle is aligned with target yaw angle. Further, the actuation device according to the present application may be configured to define an error band around the target yaw angle, and to yaw until the current yaw angle is within the error band. Particularly, the actuation device may be at least one yaw motor of the nacelle. Furthermore, the actuation device may further comprise a control unit for deactivating the at least one yaw motor when the current yaw angle is aligned with the target yaw angle.

The yaw angle according to the present application may denote an angle of the nacelle of the wind turbine relative to a wind direction of an incoming wind field. In other words, the yaw angle may denote an angle of the wind turbine rotor relative to the wind direction of the incoming wind field. Particularly, the target yaw angle may denote a desired orientation of the nacelle relative to the incoming wind field such as 0°, 90° or 180° depending on an operation mode of the wind turbine. A yaw angle of 0° may correspond to the upwind orientation of the wind turbine. A yaw angle of 180° may correspond to the downwind orientation of the wind turbine. A yaw angle of 90° may correspond to Helihoist orientation of the wind turbine or a service operation vessel orientation of the wind turbine. Further, it may be understood that the target yaw angle may be set to any yaw angle relative to the wind direction of the incoming wind field. In other words, the target yaw angle according to the present application may denote a desired yaw angle which the nacelle should reach and/or maintain.

The current yaw angle according to the present application may denote the yaw angle of the nacelle respectively the wind turbine rotor relative to the incoming wind field at a specific point in time.

A position of the nacelle respectively the nacelle position according to the present application may denote the angle of a nacelle with respect to a fixed vector normal to a yaw axis, such as 0 degrees (0°) corresponding to true north, wherein the yaw axis may be the axis around which the nacelle is yawed. Therefore, a nacelle position value may be independent of the wind direction.

A current nacelle position according to the present application may denote an actual nacelle position at a point in time. The current nacelle position along with a current wind direction may determine a current yaw angle.

The target nacelle position according to the present application may denote the nacelle position to be reached by the control system. Typically, the target nacelle position may be calculated based on the current nacelle position, the current yaw angle and a target yaw angle.

The at least one parameter indicative of wind forces acting on at least one component of the wind turbine according to the present application may denote that the current yaw angle may not be determined based on the wind direction measured by a wind direction sensor. The current yaw angle may rather be determined based on measured wind forces acting on at least one component of the wind turbine and being indicative of the relative wind direction of the incoming wind field. In other words, the detection device rather uses a force measurement than a wind measurement for determining the current yaw angle.

For determining the current yaw angle of the nacelle according to embodiments of the present invention may denote that the current yaw angle may be determined based on the detected at least one parameter.

The at least one component may be a blade, a tower, a nacelle, or a yaw motor of the wind turbine.

According to a further exemplary embodiment of the present invention, the target yaw angle is a downwind orientation of the nacelle.

The target yaw angle being the downwind orientation may provide the possibility that during extreme weather events or if the wind direction sensor fails, the nacelle may be safely brought into alignment with the downwind orientation such that loads on the wind turbine and power consumption may be reduced.

According to a further exemplary embodiment of the present invention, the detection device comprises a memory unit which is configured for storing values for the at least one parameter, the values being assigned to respective yaw angles.

The memory unit according to embodiments of the present invention may comprise a list stored in the memory unit. In the list values for the at least one parameter detected by the detection device are stored on the one hand. On the other hand, the stored values are assigned to respective yaw angles. Therefore, in the memory unit a respective yaw angle is assigned to one respective value of one respective parameter, namely to one respective parameter value. According to an exemplary embodiment of the present invention, the detection device may determine the current yaw angle by interpolating a difference or a ratio between values of two or more parameters.

Thereby, it may be possible that the current yaw angle may be detected by detecting wind forces acting on the component of the wind turbine rather than detecting a wind direction. Particularly, a value pattern may be assigned to a yaw angle range, e.g., loads may increase as the nacelle yaws from the upwind orientation to a 90° orientation and then may decrease as the nacelle yaws from the 90° orientation to the downwind orientation.

According to a further exemplary embodiment of the present invention, the detection device comprises at least one strain gauge on at least one blade of the wind turbine and is further configured for determining a rotor-induced yaw load based on data received from the at least one strain gauge as the at least one parameter indicative of wind forces acting on the at least one blade.

Providing one strain gauge on each of the three blades, particularly at a root portion of the respective blade, may provide exact rotor-induced loads. Particularly, wind force differences on the different blades may be taken into account such that an averaged value of the wind forces acting on the blades may be determined.

Providing at least two strain gauges on each of the three blades may provide a reliable and redundant configuration of the detection device. Particularly, even if one of the strain gauges on one blade fails, the at least one other strain gauge may provide the parameter indicative of wind forces acting on the blade.

The strain gauge on the blade may be a blade load sensor which is mounted to a blade root of one blade. Further, multiple strain gauges may be positioned at the blade root of each blade. The strain gauges may be configured for measuring a strain introduced by the wind forces acting on the blade. The measured strain may be an indication of the blade load on the blade.

The rotor-induced yaw load depends on the wind direction of the incoming wind field relative to the blade. Particularly, the current yaw angle may be determined by a pattern of changes in loads based on a blade azimuth position. The wind speed may influence the scale of the loads. Therefore, the rotor-induced yaw load may be a direct indication of the current yaw angle.

The blade azimuth position according to the present application denotes the angle of a blade relative to a fixed vector normal to the rotor axis (e.g., 0 degrees, 0°) corresponds to a vector pointing vertically upward from the rotor axis) which may be the position of the blade as it rotates about the hub in the rotor plane.

According to each of the aspects of embodiments of the invention, the detection device further comprises at least one first bending moment sensor on a first component of the wind turbine, and at least one second bending moment sensor on a second component of the wind turbine, wherein the detection device is further configured for determining a bending moment of the first component of the wind turbine based on data received from the first bending moment sensor as the at least one parameter indicative of wind forces acting on the at least one component of the wind turbine, and a bending moment of the second component of the wind turbine based on data measured by the second bending moment sensor, and wherein the detection device is further configured for cross-checking the bending moment of the first component of the wind turbine with the bending moment of the second component of the wind turbine.

Cross-checking may denote that the bending moment of the first component is compared with the bending moment of the second component for determining if the bending moment of the first component and the bending moment of the second component are in agreement. Being in agreement may denote that an estimate of the bending moment of the first component, particularly at a location of the first bending moment sensor, as determined based on data measured by the second bending moment sensor is within an error margin of the bending moment of the first component. The error margin may be set according to the required accuracy of the determined current yaw angle. Hence, cross-checking may denote verifying the bending moment of the first component by the bending moment of the second component. Hence, the determined current yaw angle may be verified, and a plausibility analysis may be providable.

The first bending moment sensor may be of the same type of sensor as the second bending moment sensor, the first component may be the same component as the second component, and the first bending moment sensor and the second bending moment sensor are distanced from each other on the same component. Hence, also when either the first bending moment sensor or the second bending moment sensor fails, the detection device may still determine the current yaw angle of the nacelle. Particularly, the first bending moment sensor and the second bending moment sensor may each be a strain gauge and mounted distanced to each other on the tower. Hence, even if one strain gauge fails, the tower bending moment may be determined based on the tower bending moment measured by the remaining strain gauge. Therefore, a reliable control system may be provided.

The first bending moment sensor may be of a different type of sensor as the second bending moment sensor, particularly, the first bending moment sensor may be a strain gauge and the second bending moment sensor may be an accelerometer. At the same time, the first component may be the same component as the second component, particularly, the tower. Hence, the current yaw angle determined based on the tower bending moment measured by the strain gauge may be verified by an accelerometer-based tower bending moment measured by the accelerometer.

The first bending moment sensor may be of a different type of sensor as the second bending moment sensor, and the first component may be a different component as the second component. Particularly, a strain gauge may be mounted on the tower and an accelerometer may be mounted on the nacelle. Hence, the current yaw angle determined based on the tower bending moment may be verified by an accelerometer-based bending moment measured by the accelerometer.

The first bending moment sensor may be of the same type of sensor as the second bending moment sensor, particularly, a strain gauge, and the first component may be a different component as the second component. Particularly, the first component may be the tower and the second component may be the nacelle. Hence, the current yaw angle determined based on the tower bending moment may be verified by an accelerometer-based bending moment of the nacelle measured by the accelerometer.

Hence, by cross-checking the first bending moment with the second bending moment, the detection device may more robustly determine the current yaw angle. Additionally, a plausibility analysis may be providable. Hence, a reliable control system may be providable.

According to a further exemplary embodiment of the present invention, the detection device further comprises at least one strain gauge on at least one blade and at least one further strain gauge on a tower of the wind turbine, wherein the detection device is further configured for determining a root bending moment of the at least one blade and a tower bending moment over a blade azimuth range based on data received from the at least one strain gauge and the at least one further strain gauge as the at least one parameter indicative of wind forces acting on the at least one blade and the tower.

In other words, the respective bending moment is monitored with respect to the (blade) azimuth position as the blade rotated through the entire azimuth range, namely 0° to 360°.

A current yaw angle, particularly the yaw angle relative to a downwind orientation, may be estimated by comparing the bending moments, particularly the tower bending moment and the root bending moment of the at least one blade, over the blade azimuth range to a profile of expected changes in turbine loads as the nacelle yaws from an upwind orientation to the downwind orientation. From the tower bending moment together with the root bending moment of the at least one blade the current yaw angle may be directly determined.

According to a further exemplary embodiment of the present invention, the detection device further comprises at least one accelerometer on the nacelle and/or at least one further accelerometer on the tower, wherein the detection device is further configured for determining accelerometer-based turbine loads based on data received from the at least one accelerometer and/or the at least one further accelerometer, and wherein the detection device is further configured for cross-checking the tower bending moment with the accelerometer-based turbine loads.

It may be understood that loads due to e.g., gravity or winds may cause bending moments on turbine components. Cross-checking may denote that the tower bending moment is compared with the accelerometer-based turbine loads for determining if the tower bending moment and the accelerometer-based turbine loads are in agreement. Being in agreement may denote that an estimate of the tower bending moment, particularly at a location of the further strain gauge on the tower, as determined based on data measured by the at least one accelerometer and/or the at least one further accelerometer is within an error margin of the tower bending moment. The error margin may be set according to the required accuracy of the determined current yaw angle. Hence, cross-checking may denote verifying the tower bending moment by the accelerometer-based turbine loads. Therefore, the determined current yaw angle may be verified, and a plausibility analysis may be providable.

By cross-checking the tower bending moment with the accelerometer-based turbine loads, the detection device may more robustly determine the current yaw angle. Hence, a reliable control system may be providable.

Furthermore, even if either the strain gauge or the accelerometer fails, the detection device may still determine the current yaw angle based on either the tower bending moment or the accelerometer-based turbine loads. Therefore, a redundant and failsafe control system may be providable.

According to a further exemplary embodiment of the present invention, the detection device further comprises at least one rotor azimuth sensor, wherein the detection device is further configured for determining a blade azimuth position based on data received from the at least one rotor azimuth sensor, and wherein the detection device is further configured for associating the root bending moment of the at least one blade with the measured blade azimuth position.

By associating the root bending moment with the measured blade azimuth position, the detection device may more robustly determine the current yaw angle. Hence, a reliable control system may be providable.

According to a further exemplary embodiment of the present invention, the detection device comprises a sensor for detecting at least one of an electrical current and a temperature of at least one yaw motor of the nacelle, wherein the actuation device is further configured for yawing the nacelle until an increase in in at least one of the electrical current and the temperature of the at least one yaw motor is detected by the sensor. Further, the target yaw angle is a downwind orientation.

During yawing to the downwind orientation, the yawing is helped by the incoming wind field and depending on the wind speed and hence the wind forces acting on the wind turbine, the wind turbine motors, such as the yaw motor of the nacelle, may even generate power. In other words, the motor load is indicative for the wind load on the wind turbine.

By detecting an increase in at least one of the electrical currents and the temperature of the yaw motor, the detection device may detect that the nacelle is yawing in the upwind direction.

Providing one single sensor for detecting the electrical current and the temperature of the yaw motor on each yaw motor may allow an easy system comprising solely one sensor for each yaw motor.

Providing the sensor comprising one sub-sensor element for detecting the electrical current and another sub-sensor element for detecting the temperature of the yaw motor on each yaw motor may allow to provide a reliable system because even if on sensor fails the other sensor may still provide data for determining the current yaw direction.

Thereby, an easy and reliable control system may be provided for aligning the nacelle with the downwind orientation.

According to a further exemplary embodiment of the invention, the detection device is further configured for controlling that the current yaw angle is aligned with the target yaw angle by comparing the at least one parameter indicative of wind forces acting on at least one component of the wind turbine to a threshold indicative for the target yaw angle.

According to a further exemplary embodiment of the present invention, the detection device is further configured for controlling that the current yaw angle is the downwind orientation by comparing the at least one parameter indicative of wind forces acting on at least one component of the wind turbine to a threshold indicative for the downwind orientation of the nacelle.

Thereby, the nacelle may be reliably maintained at the target yaw angle, particularly the downwind orientation even if the wind direction of the incoming wind field changes. Particularly, the control system aligns the current yaw angle with the target yaw angle. By way of example, the target yaw angle being set to correspond to the downwind orientation of the nacelle. Then the wind direction of the incoming wind field changes and therefore, the current yaw angle no longer corresponds to the downwind orientation of the nacelle. Hence, the control system according to embodiments of the present invention may provide the possibility to additionally control that the current yaw angle is adapted to be the downwind orientation of the nacelle even if the wind direction of the incoming wind field changes. In other words, the control system may additionally detect that the current yaw angle is no longer aligned with the target yaw angle and ensures that the nacelle yaws back to the target yaw angle in response to a change in wind direction of the incoming wind field because if the threshold is exceeded, the loads on the wind turbine due to the misalignment of the current yaw angle and the target yaw angle may not be acceptable.

The threshold indicative for the target yaw angle, particularly the downwind orientation of the nacelle, may be adapted dependent on the wind forces acting on the wind turbine. For example, at high wind forces, the threshold may be smaller than at low wind forces. Additionally, the threshold may be dependent on the used parameter and the wind turbine type. Therefore, a range may be defined by the threshold, which is indicative of the allowable misalignment of the current yaw angle and the target yaw angle, particularly the downwind orientation of the nacelle. Thereby, a robust alignment of the current yaw angle with the true target yaw angle. Particularly the true downwind orientation of the nacelle may be providable.

According to an exemplary embodiment of the current invention, the actuation device is further configured for periodically yawing the nacelle in both yaw directions relative to a position of the nacelle at the current yaw angle, wherein the detection device is further configured for comparing the at least one parameter indicative of wind forces acting on at least one component of the wind turbine at different nacelle positions, and for determining an extent of misalignment of the current yaw angle with respect to the target yaw angle.

Particularly, when the target yaw angle is a downwind orientation, the actuation device is further configured for periodically yawing the nacelle in both yaw directions relative to the current nacelle position, and the detection device is further configured for comparing the at least one parameter indicative of wind forces acting on at least one component of the wind turbine at different nacelle positions, and for determining an extent of misalignment of the current yaw angle with respect to the downwind orientation.

The two yaw directions may be opposite to each other. Particularly, one yaw direction may be a clockwise direction, and the other yaw direction may be an anti-clockwise direction.

Periodically yawing relative to the position of the nacelle at the current yaw angle (the current nacelle position) according to embodiments of the present invention may denote that starting from the position of the nacelle at the current yaw angle (the current nacelle position), the nacelle is yawing a certain extent in the clockwise direction and the same certain extent in the anti-clockwise direction. Thereby the different nacelle positions may correspond to a certain extent in the clockwise direction and the same certain extent in the anti-clockwise direction with respect to the current yaw angle. Hence, different yaw positions may denote a first yaw position of the nacelle relative to the position of the nacelle at the current yaw angle and a second yaw position of the nacelle distanced from the first yaw position and on an opposite side of the position of the nacelle at the current yaw angle seen in yaw direction.

Determining an extent of misalignment of the current yaw angle with respect to the target yaw angle, particularly being the downwind orientation, may denote determining a ratio or a difference of the at least one parameter indicative of wind forces acting on at least one component of the wind turbine at the different nacelle positions, and determining if the ratio or the difference is within an error tolerance of a target value, wherein the target value may be 1 for the ratio or 0 for the difference. If the ratio or difference of the at least one parameter indicative of wind forces acting on at least one component of the wind turbine at one of the different nacelle positions is within the error tolerance of the target value, the current yaw angle is considered to be aligned with the target yaw angle, particularly the downwind orientation. On the other hand, if the ratio or the difference is not within the error tolerance of the target value, the current yaw angle is not aligned with the target yaw angle, particularly the downwind orientation. The values of the at least one parameter indicative of wind forces acting on the at least one component of the wind turbine at different nacelle positions may be scaled by wind speed. Therefore, the extent of misalignment may be determined by the difference or the ratio of the parameter values.

Thereby, the control system may determine an extent of misalignment of the nacelle with respect to the target yaw angle, particularly the downwind orientation, due to wind direction changes of the incoming wind field.

According to a further exemplary embodiment of the present invention, the detection device is further configured for determining a yaw direction towards the target yaw angle based on the determined extent of misalignment of the current yaw angle with respect to the target yaw angle, and the actuation device is further configured for manipulating the position of the nacelle in the yaw direction until the current yaw angle is aligned with the target yaw angle. Further, the target yaw angle may be the downwind orientation.

The yaw direction according to embodiments of the present invention may denote the direction from the current yaw angle to the target yaw angle, particularly the downwind orientation. The yaw direction towards the target yaw angle may be chosen based on the extent of misalignment of the current yaw angle with respect to the downwind orientation. Additionally, the yaw direction towards the target yaw angle, particularly the downwind orientation, may be chosen such that the nacelle may be aligned with the target yaw angle, particularly the downwind orientation, in the fastest way based on the smallest distance between the current yaw angle and the target yaw angle, namely the downwind orientation. Thereby, a fast and reliable adjustment of the current yaw angle with the target yaw angle, namely the downwind orientation, may be providable.

The actuation device is further configured for manipulating the nacelle position in the yaw direction until the current yaw angle is aligned with the target yaw angle, particularly the downwind orientation, according to embodiments of the present invention may ensure that the alignment of the current yaw angle with the target yaw angle, particularly the downwind orientation, may reliably be maintained even when the wind direction of the incoming wind field changes during a failure of the wind direction sensors.

According to a further exemplary embodiment of the present invention, the control system further comprises an initiating device configured for activating the detection device and the actuation device based on a parameter indicative of a reliable operation of the wind turbine exceeding a predefined threshold, wherein the parameter indicative of the reliable operation of the wind turbine is at least one of a duration of a non-valid wind data condition, an estimated wind speed, and a turbine loading. Further, the target yaw angle is a downwind orientation of the nacelle.

By the initiating device, the nacelle may commence yawing to the downwind orientation even in cases when there may be no valid wind data provided by the wind direction sensor or the wind speed sensor. Hence, the turbine does not need to yaw the nacelle to the downwind orientation prematurely in order to ensure that the turbine has valid wind data throughout the yaw but instead the nacelle can stay upwind until the predefined threshold is exceeded, thus if the wind forces die down the turbine will be available to produce power sooner than if the nacelle had yawed to the downwind orientation. Further, the turbine may be protected, because when there is no valid wind data, the turbine can still determine that the nacelle should yaw downwind instead of just stopping yawing. Thereby potential high loads may be avoided due to a bad yaw angle, for example if the wind direction of the incoming wind field changes. Hence, turbine availability may be directly and indirectly increased.

The initiating device according to embodiments of the present invention may particularly be a controller configured for activating and deactivating at least one yaw motor of the nacelle. In other words, the controller may be configured for initiating a yawing of the nacelle.

The reliable operation of the wind turbine according to embodiments of the present invention may denote a safe operation state of the wind turbine at which wind forces, particularly the wind speed, acting on the wind turbine is in a range in which the nacelle may rest at the upwind orientation or in which the nacelle may rest at a yaw angle different from the downwind orientation, such as the 90° orientation for Helihoist or service operation vessel approach mode.

The predefined threshold according to embodiments of the present invention may be set to a specific value dependent on the used parameter indicative of the reliable operation of the wind turbine.

The non-valid wind data condition according to the present application may denote a state in which at least one wind sensor of the wind turbine is not working, e.g., because the sensor is blocked by a component of the wind turbine, such as the nacelle. Additionally, the wind sensor may fail due to fast changes of the wind direction of the incoming wind field such that the wind direction signal generated by the sensor may not be trusted.

The predefined threshold associated with the non-valid wind data condition may be a time period indicative of the time in which the wind turbine may remain safely at the current yaw angle being for example the upwind orientation or close to the upwind orientation, while the wind data received is not valid or erroneous. If the time period without valid wind data is too long, wind changes may become too large and therefore the detection device and the actuation device may be activated to manipulate the current nacelle position until the current yaw angle is aligned with the target yaw angle. Hence, the nacelle may be activated to yaw to the downwind orientation to protect the wind turbine.

The estimated wind speed may be determined by a sensor configured for detecting a turbine rotor speed. From the turbine rotor speed the wind speed of the incoming wind field may directly be estimated. Alternatively, the estimated wind speed may be measured by a wind speed sensor. When a wind speed sensor is used for determining the estimated wind speed, the estimate may be based on the last valid measurement or last series of valid measurements.

The predefined threshold associated with the estimated wind speed may be set to correspond to a cut-out wind speed. The cut-out wind speed may denote the maximum wind speed at which power may safely be produced by the wind turbine. Alternatively, the predefined threshold may be set to a different wind speed based on sensor capability or based on ensuring that the loads experienced by the wind turbine as the nacelle yaws to the target yaw angle being the downwind orientation, do not exceed the predefined threshold. Particularly, the threshold for activation of downwind yawing is established based on a load analysis to ensure that while yawing to the downwind orientation the loads experienced by the turbine, which are highest as the nacelle yaws through the 90-degree orientation, does not exceed the threshold. This threshold may be determined by and may differ by different wind turbines.

In other words, if the estimated windspeed exceeds the predefined threshold, the manipulating of the current nacelle position to the downwind orientation may be activated by the initiating device.

The turbine loading may be determined by tower and blade bending moments and/or by tower and nacelle accelerations. The predefined threshold associated with the turbine loading may correspond to the turbine loading which still allows a safe and reliable operation of the wind turbine. If the predefined turbine loading threshold is exceeded, the yawing of the nacelle may be initiated by the initiating device. Then the nacelle is yawed such that the current yaw angle is aligned with the target yaw angle, which is the downwind orientation.

According to a further aspect of embodiments of the present invention, there is described a wind turbine. The wind turbine comprises an above-described control system.

The wind turbine comprising the above-described control system may be based on the idea that the nacelle of the wind turbine may be aligned with a target yaw angle also under circumstances in which the wind direction sensor(s) may provide erroneous values or no values at all. Additionally, the likelihood that the wind turbine tries to yaw to or maintain a yaw angle that is not aligned with the true target yaw angle, particularly the true downwind orientation, may be decreased. As a result, loads acting on the wind turbine may be reduced. Additionally, the yaw motor(s) may not consume excess power trying to maintain the nacelle at a slightly erroneous yaw angle, particularly a slightly upwind orientation. The described control system may also allow the wind turbine to have a higher wind speed threshold for yawing the nacelle to the downwind orientation. This may increase the availability of the wind turbine. Particularly, if the wind drops back below the maximum cut-in wind speed, the wind turbine does not have to first yaw back to the upwind orientation to produce power. Further, excessive loading on the wind turbine may be inhibited by yawing the nacelle to the target yaw angle, particularly being the downwind orientation, instead of just stopping yawing when no valid wind data are available while maintaining the upwind orientation.

According to a further exemplary embodiment of the present invention, the wind turbine further comprises (a) a wind direction sensor, (b) a monitoring device configured for (i) detecting a failure of the wind direction sensor, (ii) detecting a failure position of the nacelle and/or a yaw velocity at the failure of the wind direction sensor, (iii) determining a recovery position of the nacelle at which the wind direction sensor is expected to be recovered from failure, (iv) determining a yaw distance being a distance between the failure position of the nacelle and the recovery position of the nacelle. (c) a yawing device configured for yawing the nacelle for a time period, wherein the time period is based on the yaw distance and/or the yaw velocity, and (d) a decision device configured for (i) detecting a continued failure of the wind direction sensor after the time period, and (ii) configured for alternatively activating the detection device and the actuation device based on the continued failure of the wind direction sensor when the target yaw angle is different from the upwind orientation, in particular the downwind orientation, or stopping the yawing of the nacelle when the target yaw angle is the upwind orientation.

In other words, the wind turbine further comprises (a) a wind direction sensor, (b) a monitoring device configured for (i) detecting a failure of the wind direction sensor, (ii) detecting a failure nacelle position at the failure of the wind direction sensor, (iii) determining a failure yaw angle at the failure of the wind direction sensor based on the last reliable wind direction, (iv) determining a recovery nacelle position where the wind direction sensor may no longer be failed, (v) determining a recovery yaw distance between the failure nacelle position and the recovery nacelle position, (vi) detecting a yaw velocity at the failure of the wind direction sensor, (c) a yawing device (i) configured for yawing the nacelle to the recovery nacelle position by (i-a) monitoring the current nacelle position or by (i-b) yawing the nacelle for a time period based on the recovery yaw distance and the yaw velocity, and (d) a decision device (i) configured for detecting a continued failure of the wind direction sensor after the recovery nacelle position is reached, and (ii) configured for alternatively (ii-a) activating the detection device and the actuation device based on the continued failure of the wind direction sensor to complete the yaw to the target yaw angle when the target yaw angle is not the upwind orientation and is in particular the downwind orientation, or (ii-b) stopping the yawing of the nacelle when the target yaw angle is the upwind orientation.

The wind direction sensor may comprise a single sensor. This may provide an easy structure of the wind direction sensor. Alternatively, the wind direction sensor may comprise two or more sensors. This may provide a reliable and redundant structure of the wind direction sensor. Additionally, the wind direction sensor(s) may be mounted to the nacelle at a position adjacent to the hub seen in the direction of the rotor axis and/or at a rear end of the nacelle. Further, the wind direction sensor may be mounted to the top of the nacelle or to a position distanced about 90° to the top of the nacelle around the rotor axis. Additionally, the wind turbine may comprise three wind direction sensors, one at the top of the nacelle and the other two each distanced 90° to the wind direction sensor on the top of the nacelle on respective sides of the nacelle.

The monitoring device according to embodiments of the present invention may detect the failure of the wind direction sensor. The failure of the wind direction sensor may denote that the wind direction sensor no longer provides any signal indicative of the wind direction at all or that the wind direction sensor provides erroneous values.

A last reliable wind direction signal may be the most recent valid wind direction value received prior to the detection of the wind direction sensor failure, or the most recent series of valid wind direction values received prior to the detection of the wind direction sensor failure.

The failure nacelle position may correspond a position of the nacelle at which the last reliable wind direction signal may have been received. Additionally, a failure yaw angle may correspond to a yaw angle determined from the last reliable wind direction signal.

A recovery yaw angle may correspond to a yaw angle at which a reliable wind direction signal is expected to be available, due to e.g., the wind sensor no longer being blocked by for example the nacelle, due to sensor location and/or wind turbine geometry.

When the target yaw angle is the downwind orientation, the recovery yaw angle may correspond to a yaw angle at which the yaw to the target yaw angle may reliably be completed based on the detection device.

The recovery yaw distance may denote a remaining (angular) distance between the failure nacelle position and the recovery nacelle position. Thereby, the recovery yaw distance may be set such that the nacelle yaws a distance which may allow the wind direction sensor to be brought out of a blocked area or, particularly in the case where the target yaw angle is the downwind orientation, such that the yaw to the target yaw angle may be completed using the detection device. The recovery yaw angle may be less than the target yaw angle. In other words, the recovery yaw distance may be such that the nacelle yaws to a yaw angle different from the target yaw angle and positioned between the failure yaw angle and the target yaw angle. Hence, while yawing from the failure nacelle position to the recovery nacelle position, changes of the wind direction of the incoming wind field may be neglected by the monitoring device.

The monitoring device according to embodiments of the present invention may detect a failure position of the nacelle at the failure of the wind direction sensor based on the last reliable wind direction sensor data. Additionally, or alternatively, the monitoring device may detect a yaw velocity of the nacelle at the failure of the wind direction sensor. Particularly, the yaw velocity may be detected by at least one sensor measuring data indicative of the yaw velocity of the nacelle.

The recovery position of the nacelle may be the position at which the wind direction sensor is expected to recover from failure. Particularly, the recovery position of the nacelle may be determined based on the failure nacelle position, the failure yaw angle and the recovery yaw angle.

The wind direction sensor may be recovered from failure for example because the wind direction sensor may be brought out of a blocked area.

The yaw distance may be an angular distance between the failure position of the nacelle and the recovery position of the nacelle.

The time period may be based on the yaw distance and/or the yaw velocity at the point in time when the failure of the wind direction sensor is detected. Particularly, the time period may be determined such that the nacelle yaws to the recovery position of the nacelle. The recovery position of the nacelle may be positioned in-between the failure position of the nacelle and the position of the nacelle at which the current yaw angle is aligned with the target yaw angle, seen in a yaw direction of the nacelle. Hence, while yawing from the failure position of the nacelle to the recovery position of the nacelle, changes of the wind direction of the incoming wind field may be neglected by the monitoring device.

The yawing device according to embodiments of the present invention may comprise a yaw motor configured for yawing the nacelle of the wind turbine. Additionally, the yawing device may comprise at least one control element or controller configured for activating and deactivating the at least one yaw motor of the nacelle.

The yawing device, particularly the control element or controller, may accomplish the yaw over the recovery yaw distance by monitoring the current nacelle position and deactivating the at least one yaw motor when the current nacelle position is aligned with the recovery nacelle position.

Alternatively, the yawing device, particularly the control element or controller, may accomplish the yaw over the recovery yaw distance by activating the at least one yaw motor for the duration of the time period.

The continued failure of the wind direction sensor after the time period may particularly denote a detection of a further failure or a detection that the wind direction sensor is still blocked (e.g., due to a change in wind direction). In both cases the wind direction sensor after the time period, particularly after the yaw to the recovery position of the nacelle is completed, provides an erroneous wind direction signal or no wind direction signal at all. Hence, the decision device is configured for detecting that the continued yawing of the nacelle, particularly the yawing to the recovery nacelle position, has not unblocked the wind direction sensor. Thereby, a further yawing of the nacelle to the target yaw angle may not be based on data provided by the wind direction sensor.

When the target yaw angle is different from the upwind orientation, and is in particular the downwind orientation, and the decision device has detected the continued failure of the wind direction sensor after the time period, particularly after the yaw to the recovery nacelle position is completed, the nacelle may be yawed to the target yaw angle, particularly being the downwind orientation, by utilizing the detection device as well as the actuation device. Thereby, damage of the wind turbine due to erroneous wind velocity and/or wind direction data may be reliably inhibited.

When the target yaw angle is the upwind orientation and the decision device has detected the continued failure of the wind direction sensor after the time period, particularly after the yaw to the recovery nacelle position is completed, the nacelle may be stopped and remain at the current position of the nacelle until the wind direction sensor may have recovered and may provide valid data again. Therefore, excessive energy consumption of the yaw motor may be inhibited because the wind turbine stops yawing. Particularly, brakes may be holding the nacelle at the recovery position of the nacelle and therefore no energy may be required to maintain the position.

According to a further aspect of embodiments of the present invention, there is described a method for aligning a nacelle of a wind turbine with a target yaw angle. In embodiments, the method comprises (a) detecting at least one parameter indicative of wind forces acting on at least one component of the wind turbine for determining a current yaw angle of the nacelle, and (b) manipulating a position of the nacelle until the current yaw angle is aligned with the target yaw angle.

In embodiments, the method further comprises providing at least one first bending moment sensor on a first component of the wind turbine, providing at least one second bending moment sensor on a second component of the wind turbine, further determining a bending moment of the first component of the wind turbine based on data received from the first bending moment sensor as the at least one parameter indicative of wind forces acting on the at least one component of the wind turbine, and a bending moment of the second component of the wind turbine based on data measured by the second bending moment sensor, and cross-checking the bending moment of the first component of the wind turbine with the bending moment of the second component of the wind turbine.

The described method is based on the idea that the nacelle of the wind turbine may be aligned with a target yaw angle also when the wind direction sensor(s) may provide erroneous values or no values at all. Additionally, the likelihood that the wind turbine tries to yaw to or maintain a yaw angle that is not aligned with the target yaw angle, particularly the downwind orientation, may be decreased. As a result, loads acting on the wind turbine may be reduced. Additionally, the yaw motor(s) may not consume excessive power trying to maintain a slightly erroneous yaw angle, particularly a slightly upwind orientation. The described method may also allow the wind turbine to have a higher wind speed threshold for yawing to the downwind orientation. This may increase the availability of the wind turbine. Particularly, if the wind drops back below the maximum cut-in wind speed, the wind turbine does not have to first yaw back to the upwind orientation to produce power.

Additional existing turbine sensors (sensors indicative of wind forces acting on at least one component of the wind turbine) or time may be used to supplement, cross-check or replace a wind direction signal provided by a wind sensor (wind direction sensor) while yawing to, from or in the vicinity of a downwind orientation. According to a first exemplary approach, at least one existing non-wind sensor, namely at least one existing sensor detecting at least one parameter indicative of wind forces acting on at least one component of the wind turbine, may be used. Particularly, when a nacelle of a wind turbine is yawing to or from the downwind orientation or is maintaining the downwind orientation, a comprehensive sensor strategy that utilizes information provided by existing sensors detecting at least one parameter indicative of wind forces acting on at least one component of the wind turbine to supplement, cross-check or replace the signal from wind (direction) sensors.

The sensor detecting at least one parameter indicative of wind forces acting on at least one component of the wind turbine may be a strain gauge on at least one blade of the wind turbine (blade load sensor) configured for determining a rotor induced yaw load as an indication of a relative wind direction.

Further, the sensors detecting at least one parameter indicative of wind forces acting on at least one component of the wind turbine may be straining gauges on the blades and the tower of the wind turbine, combined with accelerometers on the nacelle and the tower. A tower bending moment along with root bending moments of each blade over a blade azimuth range may be derived/determined from the strain gauges, with load estimates based on the accelerometers on the tower and/or the nacelle serving as a cross-check of the tower bending moment. The current yaw angle relative to the downwind orientation may be estimated by comparing the bending moments over a blade azimuth range to a profile of an expected change in turbine loads as the nacelle yaws from an upwind orientation to the downwind orientation.

Additionally, the at least one sensor detecting at least one parameter indicative of wind forces acting on at least one component of the wind turbine may comprise at least one sensor indicative for an electrical current and/or temperature of at least one yaw motor of the wind turbine. During yawing to the downwind orientation, the yawing is helped by wind forces, and depending on a wind speed, the wind turbine yaw motors may even be caused to generate power. The nacelle may yaw until a significant increase in yaw current or temperature indicates that the nacelle is now trying to yaw in the upwind direction.

The nacelle of the wind turbine may also be maintained at the downwind orientation using the at least one parameter indicative of wind forces acting on at least one component of the wind turbine based on the one hand on a comparison of sensor outputs to thresholds to indicate that the yaw angle that the nacelle is trying to maintain does no longer correspond to the downwind orientation, e.g., due to a change of the wind direction of the incoming wind field. On the other hand, the nacelle may also be maintained at the downwind orientation based on periodically yawing the nacelle for a short distance in both directions and comparing sensor or yaw motor current outputs to determine the extent of misalignment with respect to the downwind orientation and the direction in which an adjustment should be made.

The described comprehensive sensor strategy may be used to provide an estimate of a current yaw angle relative to the downwind orientation when the single wind (direction) sensor is temporarily blocked. Additionally, in the case where the wind (direction) sensors do not or not reliably provide an indication of erroneous signal or failure, the comprehensive sensor strategy, including a rotor speed, may be used to determine when the wind speed has subsided to a point where the wind (direction) sensor signals may be trusted.

Additionally, if the wind sensor fails while yawing to the downwind orientation or back to the upwind orientation, the nacelle continues yawing for a period of time based on a current yaw speed/velocity and/or based on a recovery position of the nacelle, wherein the recovery position of the nacelle may be based on a current position of the nacelle and a current yaw angle at the time at which the last known reliable wind direction sensor signal was received, as well as on a recovery yaw angle of the wind sensor. The recovery yaw angle may be the yaw angle at which the wind direction sensor is expected to no longer be blocked by the nacelle, or alternatively, and particularly in the case where the target yaw angle is the downwind orientation, where the parameters indicative of wind forces acting on at least one component of the wind turbine (the non-wind sensors) as described above may reliably be used to complete the yaw to the downwind orientation. If the wind sensor has failed due to being blocked, the additional yawing may bring it out of the blocked sector. If the wind sensor does not provide a reliable wind direction signal after a time period, particularly after the recovery nacelle position is reached. Then a yawing is stopped (if the target yaw angle is the upwind orientation) or the parameters indicative of wind forces acting on at least one component of the wind turbine (the non-wind sensors) as described above may be used to arrive at the target yaw angle (particularly if the target yaw angle is the downwind orientation).

Further, existing turbine sensors or time may be used to supplement or replace a wind direction signal received by the wind sensor when the nacelle is at the upwind orientation. In areas where extreme wind events occur, it may be desirable that the actuation device manipulates the current position of the nacelle until the current yaw angle is aligned with the downwind orientation based on criteria which may include a duration of the non-valid wind data condition exceeding a threshold, a last valid measurement being above a cut-out wind speed (or any other wind speed threshold based on a sensor capability or loads experienced by the wind turbine as it yaws downwind), tower and blade bending moments and tower and nacelle accelerations indicating a turbine loading exceeding a threshold.

Additionally, if a wind direction of the incoming wind field changes between a wind sensor failure and a triggering of a manipulating of a current position of the nacelle by the actuation device, in the direction towards the downwind orientation, the yaw motor current in combination with the detected loads as described above may be used by the detection device for determining a downwind yaw direction.

In other words, the control system may be used to yaw the nacelle to and maintain any target yaw angle or target position of the nacelle out of alignment with the turbine's normal operational orientation, e.g., for downwind idling (180° yaw angle) or for Helihoist (90° yaw angle) or service operation vessel approach modes (90° yaw angle), without upgrading wind sensors. Further, the availability of that capability may be increased without reducing an annual energy production.

Thereby, a use of parameters indicative of wind forces acting on at least one component of a wind turbine may supplement, cross-check or replace wind (direction) sensor information when yawing to or maintaining the downwind orientation under extreme weather situations where the wind sensors fail or provide erroneous readings. Additionally, time and/or a last known reliable data when wind sensor data is not available may be used. Particularly, a time delay may be used before stopping yawing to or from the downwind orientation due to a failure of the wind (direction) sensor, in order to transit the nacelle through a blocked sector. Alternatively, when the nacelle is at a position where the current yaw angle corresponds to the upwind orientation, a last known reliable data from the failed wind sensor may be used in combination with the parameter indicative of wind forces acting on at least one component of the wind turbine, to initiate the manipulating of the current nacelle position until the current yaw angle is aligned with target yaw angle corresponding to the downwind orientation.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Figure 2:
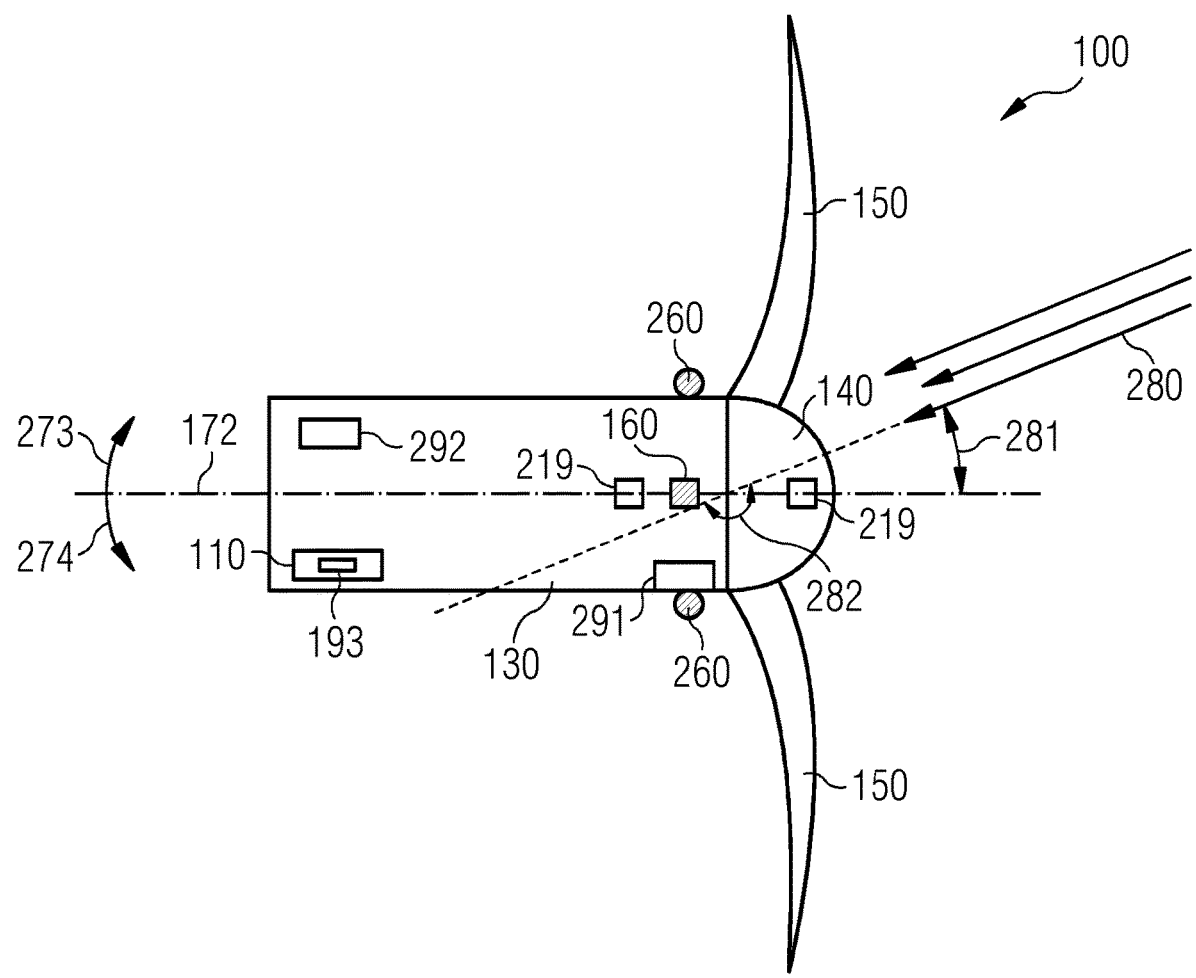

Some of the embodiments will be described in detail, with references to the following Figures, wherein like designations denote like members, wherein:

FIG. 1 shows a side view of a wind turbine comprising a control system according to an exemplary embodiment of the present invention; and FIG. 2 shows a top view of a wind turbine comprising a control system according to an exemplary embodiment of the present invention.

DETAILED DESCRIPTION

FIG. 1 shows a side view of a wind turbine 100 comprising a control system 110 according to an exemplary embodiment of the present invention. The wind turbine 100 further comprises a tower 120, a nacelle 130 mounted to the tower 120, and a hub 140 mounted to the nacelle 130. The nacelle 130 is mounted to the tower 120 and is rotatably around a yaw axis 171 via a yaw motor 180 providing a yawing around the yaw axis 171. Three blades 150, from which solely two blades 150 are shown in FIG. 1, are mounted to the hub 140. The blades 150 rotate around a rotor axis 172. The control system 110 is mounted to the nacelle 130. The wind turbine 100 further comprises a wind direction sensor 160 mounted to a top side of the nacelle 130 at a position adjacent to the hub 140 seen in the direction of the rotor axis 172. The control system 110 comprises a strain gauge 111 mounted to a blade root of each blade 150. The strain gauge 111 may be a bending moment sensor 111, particularly a blade load sensor. Even though solely one strain gauge 111 is shown in FIG. 1 mounted to the blade root of each blade 150, it may be understood that multiple strain gauges 111 may be mounted to each blade root of each of the three blades 150.

Further, the control system 110 comprises three further strain gauges 112 on the tower 120. Each of the three further strain gauges 112 may be a bending moment sensor 112. A first of the further strain gauges 112 is positioned at a tower top position, a second of the further strain gauges 112 is positioned at a mid-tower position of the tower 120 and a third of the further strain gauges 112 is positioned at a tower bottom position. The three further strain gauges 112 on the tower 120 and the strain gauges 111 on the blades 150 together may provide tower bending moments of the tower 120 along with root bending moments of each blade 150. It may be understood that one or two further strain gauge(s) 112 may be positioned on the tower 120. Additionally, it may be understood that solely one further strain gauge 112 may be positioned on the tower 120, particularly on the tower top position.

The control system 110 further comprises three further accelerometers 113 positioned on the tower 120. Each of the three further accelerometers 113 may be a bending moment sensor 113. A first of the further accelerometers 113 is positioned at the tower top position, a second of the further accelerometers 113 is positioned at the mid-tower position and a third of the further accelerometers 113 is positioned at the tower bottom position. Additionally, it may be understood that solely one further accelerometer 113 may be positioned on the tower 120, particularly at the tower top position. Each of the three further accelerometers 113 is positioned on the same height as a respective one of the three further strain gauges 112. Additionally, an accelerometer 116 is positioned at the nacelle 130. The accelerometer may be a bending moment sensor 116. The data provided by the further accelerometers 113 on the tower 120 and/or the data provided by the accelerometer 116 on the nacelle 130 may provide a cross-check for the tower bending moment determined based on the data provided by the further strain gauges 112 on the tower 120.

Additionally, a plurality of accelerometers 116 may be positioned around the nacelle 130. Further, a rotor azimuth sensor 117, for example an accelerometer or encoder, is positioned in the hub 140 as shown or in the nacelle 130.

The wind turbine 100 further comprises at least one yaw motor 180 comprising a sensor 118 for detecting at least one of an electrical current of the yaw motor 180 and a temperature of the yaw motor 180. Additionally, the control system 110 comprises a controller 181 configured for initiating a yawing of the nacelle 130, particularly activating or deactivating the yaw motor 180.

A memory unit 193 is arranged at the nacelle 130 in which values for the at least one parameter is/are stored, the values being assigned to respective yaw angles 281 (shown in FIG. 2).

FIG. 2 shows a top view of a wind turbine 100 comprising a control system 110 according to an exemplary embodiment of the present invention.

The current yaw angle 281 of the nacelle 130 relative to the wind direction of the incoming wind field 280 is shown in FIG. 2. Additionally, a yaw direction 273 corresponding to the clockwise direction and an opposite yaw direction 274 corresponding to the anti-clockwise direction are illustrated in FIG. 2. Further, according to the exemplary embodiment as illustrated in FIG. 2, the target yaw angle 282 is the downwind orientation. It may be understood that the target yaw angle 282 may be any other yaw angle than the downwind orientation. The yaw direction 273 and the opposite yaw direction 274 correspond to both yaw directions 273, 274 in which the nacelle 130 may periodically be yawed by the yaw motor 180 relative to the current yaw angle 281. The strain gauges 111, the further strain gauges 112 and the sensor 118 may determine an extent of misalignment of the current yaw angle 281 with the target yaw angle 282 and may determine the yaw direction 273 towards the target yaw angle 282. In FIG. 2 the nacelle 130 and the hub 140 may be yawed in the yaw direction 273 or 274 until the current yaw angle 281 is aligned with target yaw angle 282.

The wind turbine 100 further comprises two further wind direction sensors 260 each arranged on one side of the nacelle 130 seen relative to the rotor axis 172. The two further wind direction sensors 260 are arranged adjacent to the hub 140 seen in the direction of the rotor axis 172. Further, the two further wind direction sensors 260 are arranged distanced by a respective 90° angle with respect to the wind direction sensor 160.

A first rotor speed sensor 219 is positioned on the hub 140 and a second rotor speed sensor 219 is positioned on the nacelle 130. The rotor comprises the hub 140 and the blades 150. The rotor speed sensor 219 is positioned on the hub 140 and/or the nacelle 130 dependent on the specific type of used rotor speed sensor 219. The rotor speed sensors 219 may be used to provide a wind speed estimate to replace the wind speed signal from the wind sensor when it is not available or invalid, or as cross-check to determine when the signals from the wind sensor may be trusted.

The monitoring device 291 is arranged adjacent to one of the wind direction sensors 260 and the decision device 292 is arranged at a rear end of the nacelle 130 opposite to the hub 140. It may be understood that the monitoring device 291 and the decision device 292 may be arranged adjacent to each other. Additionally, it may be understood that the monitoring device 291 and the decision device 292 may be arranged distanced from each other on the nacelle 130.

The nacelle 130 will be aligned with the target yaw angle 282, particularly the upwind orientation or the downwind orientation 282, by activating the yaw motor 180, particularly by the controller 181.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control system for aligning a nacelle of a wind turbine with a target yaw angle, the control system comprising:
a detection device configured for detecting at least one parameter indicative of wind forces acting on at least one component of the wind turbine for determining a current yaw angle of the nacelle, and
an actuation device configured for manipulating a position of the nacelle until the current yaw angle is aligned with the target yaw angle,
wherein the detection device further comprises at least one first bending moment sensor on a first component of the wind turbine, and at least one second bending moment sensor on a second component of the wind turbine,
wherein the detection device is further configured for determining a bending moment of the first component of the wind turbine based on data received from the first bending moment sensor as the at least one parameter indicative of wind forces acting on the at least one component of the wind turbine, and a bending moment of the second component of the wind turbine based on data measured by the second bending moment sensor, and
wherein the detection device is further configured for cross-checking the bending moment of the first component of the wind turbine with the bending moment of the second component of the wind turbine.

2. The control system of claim 1,
wherein the target yaw angle is a downwind orientation of the nacelle.

3. The control system of claim 2,
wherein the detection device comprises a sensor for detecting at least one of an electrical current and a temperature of at least one yaw motor of the nacelle,
wherein the actuation device is further configured for yawing the nacelle until an increase in at least one of the electrical current and the temperature of the at least one yaw motor is detected by the sensor.

4. The control system of claim 2,
wherein the control system further comprises an initiating device configured for activating the detection device and the actuation device based on a parameter indicative of a reliable operation of the wind turbine exceeding a predefined threshold; and
wherein the parameter indicative of the reliable operation of the wind turbine is at least one of a duration of a non-valid wind data condition, an estimated wind speed, and a turbine loading.

5. The control system of claim 1,
wherein the detection device comprises a memory unit which is configured for storing values for the at least one parameter, the values being assigned to respective yaw angles.

6. The control system of claim 1,
wherein the detection device comprises at least one strain gauge on at least one blade of the wind turbine, and
wherein the detection device is further configured for determining a rotor-induced yaw load based on data received from the at least one strain gauge as the at least one parameter indicative of wind forces acting on the at least one blade.

7. The control system of claim 6, wherein the actuation device is further configured for periodically yawing the nacelle in both yaw directions relative to a position of the nacelle at the current yaw angle; and
wherein the detection device is further configured for comparing the at least one parameter indicative of wind forces acting on at least one component of the wind turbine at different nacelle positions, and for determining an extent of misalignment of the current yaw angle with respect to the target yaw angle.

8. The control system of claim 1,
wherein the detection device further comprises at least one strain gauge on at least one blade, at least one further strain gauge on a tower, and a rotor azimuth sensor,
wherein the detection device is further configured for determining a tower bending moment and a root bending moment of the at least one blade over a blade azimuth range based on data received from the at least one strain gauge, the at least one further strain gauge and the rotor azimuth sensor as the at least one parameter indicative of wind forces acting on the at least one blade and the tower.

9. The control system of claim 8,
wherein the detection device further comprises at least one nacelle accelerometer and/or at least one tower accelerometer, and
wherein the detection device is further configured for determining accelerometer-based turbine loads based on data received from the at least one nacelle accelerometer and/or the at least one tower accelerometer, and for cross-checking the tower bending moment with the accelerometer-based turbine loads.

10. The control system of claim 8, wherein the actuation device is further configured for periodically yawing the nacelle in both yaw directions relative to a position of the nacelle at the current yaw angle; and
wherein the detection device is further configured for comparing the at least one parameter indicative of wind forces acting on at least one component of the wind turbine at different nacelle positions, and for determining an extent of misalignment of the current yaw angle with respect to the target yaw angle.

11. The control system according to claim 1,
wherein the detection device is further configured for controlling that the current yaw angle is aligned with the target yaw angle by comparing the at least one parameter indicative of wind forces acting on at least one component of the wind turbine to a threshold indicative for the target yaw angle.

12. The control system of claim 11,
wherein the actuation device is further configured for periodically yawing the nacelle in both yaw directions relative to a position of the nacelle at the current yaw angle, and
wherein the detection device is further configured for comparing the at least one parameter indicative of wind forces acting on at least one component of the wind turbine at different nacelle positions, and for determining an extent of misalignment of the current yaw angle with respect to the target yaw angle.

13. The control system of claim 1,
wherein the actuation device is further configured for periodically yawing the nacelle in both yaw directions relative to a position of the nacelle at the current yaw angle; and
wherein the detection device is further configured for comparing the at least one parameter indicative of wind forces acting on at least one component of the wind turbine at different nacelle positions, and for determining an extent of misalignment of the current yaw angle with respect to the target yaw angle.

14. The control system of claim 13,
wherein the detection device is further configured for determining a yaw direction towards the target yaw angle based on the extent of misalignment of the current yaw angle with respect to the target yaw angle; and
wherein the actuation device is further configured for manipulating the position of the nacelle in the yaw direction until the current yaw angle is aligned with the target yaw angle.

15. The control system of claim 14,
wherein the control system further comprises an initiating device configured for activating the detection device and the actuation device based on a parameter indicative of a reliable operation of the wind turbine exceeding a predefined threshold; and
wherein the parameter indicative of the reliable operation of the wind turbine is at least one of a duration of a non-valid wind data condition, an estimated wind speed, and a turbine loading.

16. The control system of claim 1, wherein cross-checking comprises verifying the bending moment of the first component of the wind turbine by the bending moment of the second component of the wind turbine.

17. A wind turbine comprising a tower, a nacelle mounted on the tower, a hub mounted to the nacelle, and blades mounted to the hub, the wind turbine further comprising a control system for aligning the nacelle of the wind turbine with a target yaw angle, the control system comprising:
a detection device configured for detecting at least one parameter indicative of wind forces acting on at least one component of the wind turbine for determining a current yaw angle of the nacelle; and
an actuation device configured for manipulating a position of the nacelle until the current yaw angle is aligned with the target yaw angle;
wherein the detection device further comprises at least one first bending moment sensor on a first component of the wind turbine, and at least one second bending moment sensor on a second component of the wind turbine;
wherein the detection device is further configured for determining a bending moment of the first component of the wind turbine based on data received from the first bending moment sensor as the at least one parameter indicative of wind forces acting on the at least one component of the wind turbine, and a bending moment of the second component of the wind turbine based on data measured by the second bending moment sensor; and
wherein the detection device is further configured for cross-checking the bending moment of the first component of the wind turbine with the bending moment of the second component of the wind turbine.

18. The wind turbine of claim 17, further comprising a wind direction sensor, and
a yawing device configured for yawing the nacelle.

19. A method for aligning a nacelle of a wind turbine with a target yaw angle, the method comprising:
providing at least one first bending moment sensor on a first component of the wind turbine;
providing at least one second bending moment sensor on a second component of the wind turbine;
detecting at least one parameter indicative of wind forces acting on at least one component of the wind turbine for determining a current yaw angle of the nacelle, and
manipulating a position of the nacelle until the current yaw angle is aligned with the target yaw angle;
determining a bending moment of the first component of the wind turbine based on data received from the first bending moment sensor as the at least one parameter indicative of wind forces acting on the at least one component of the wind turbine, and a bending moment of the second component of the wind turbine based on data measured by the second bending moment sensor; and
cross-checking the bending moment of the first component of the wind turbine with the bending moment of the second component of the wind turbine.

* * * * *